T. D. PERRY.
COMPUTING SCALE.
APPLICATION FILED JUNE 26, 1916.
1,258,041.
Patented Mar. 5, 1918.
2 SHEETS—SHEET 2.
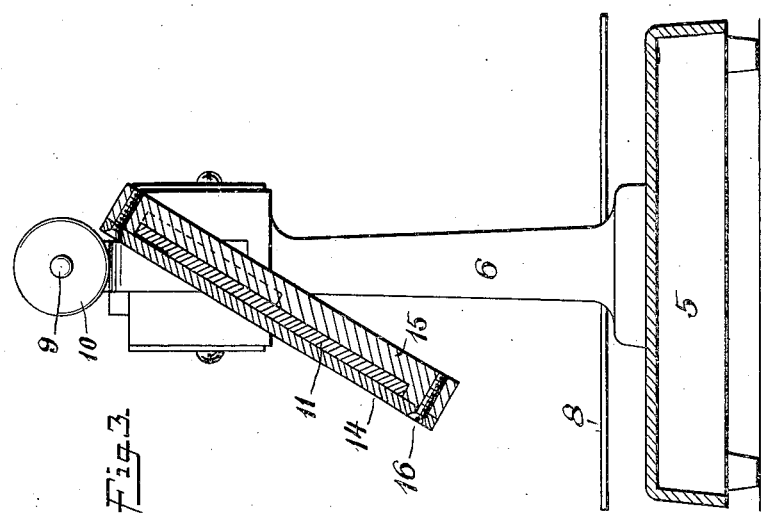
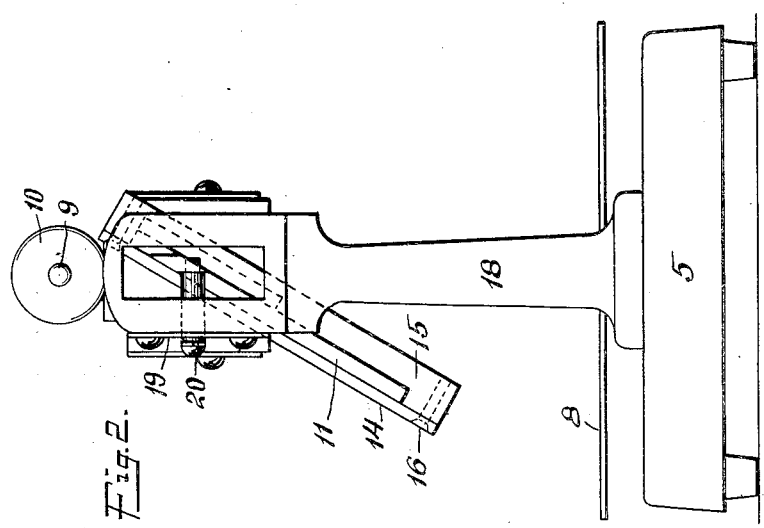

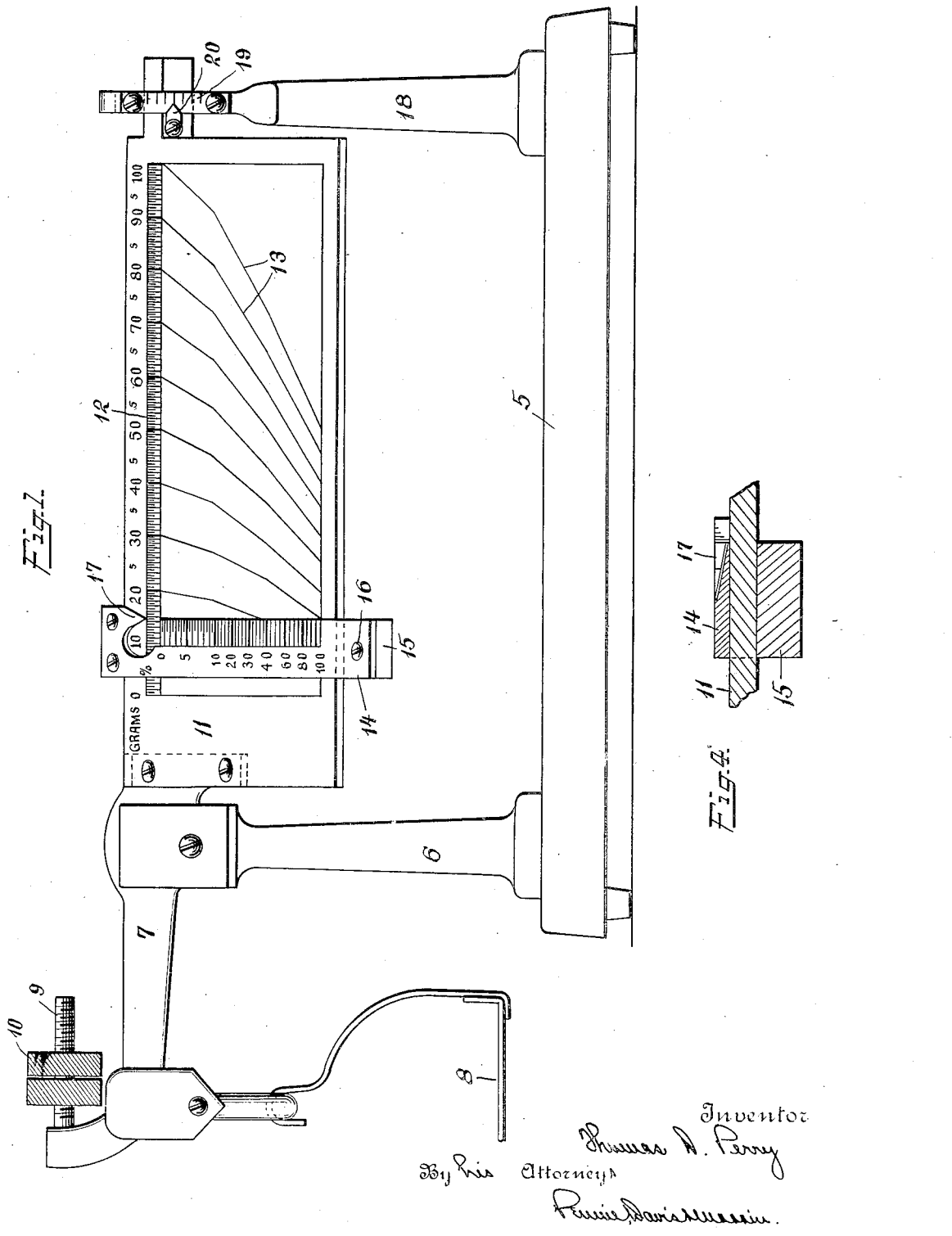

UNITED STATES PATENT OFFICE.

THOMAS D. PERRY, OF GRAND RAPIDS, MICHIGAN, ASSIGNOR TO GRAND RAPIDS VENEER WORKS, OF GRAND RAPIDS, MICHIGAN, A CORPORATION OF MICHIGAN.

COMPUTING-SCALE.

1,258,041. Specification of Letters Patent. Patented Mar. 5, 1918.

Application filed June 26, 1916. Serial No. 105,826.

*To all whom it may concern:*

Be it known that I, THOMAS D. PERRY, a citizen of the United States, residing in the city of Grand Rapids, county of Kent, and State of Michigan, have invented certain new and useful Improvements in Computing-Scales; and I do hereby declare the following to be a full, clear, and exact description of the invention, such as will enable others skilled in the art to which it appertains to make and use the same.

This invention is directed to the provision of an improved form of computing scale. The primary object of the invention is to provide a computing scale for use in connection with the drying of lumber to facilitate determining when the drying operation has been carried far enough.

In drying lumber it is common practice to place the lumber in a kiln and to subject it to heat to drive off the moisture, sap, etc., contained in the wood. At intervals during the drying operation a test piece is taken from the kiln and the moisture remaining in the wood is ascertained by measurements made upon this test piece. A common practice is to weigh the test piece or a section cut therefrom immediately after it is taken from the kiln, then subject the piece so weighed to high heat so as to drive off all of the moisture therein, reducing the piece to what is known as "bone dry", then weigh the same piece in the bone dry condition, and then, from the measurements thus obtained, calculate the percentage of moisture in the piece at the time it was taken from the kiln. The present invention is directed to the provision of a computing scale specially adapted for this use in that test pieces may be placed thereon immediately after being taken from the kiln and again after being dried to the bone dry condition, and in that a chart is provided coacting with the counterpoise of the scale so that after the second weighing operation has been performed, the percentage of moisture in the wood at the time the test piece was taken from the kiln may be read directly from the chart. The chart is provided with a series of approximately parallel lines and one of these is selected by reference to the position of the counterpoise when the beam of the scale is poised in weighing the test piece when the latter is first taken from the kiln; then, when the test piece has been reduced to a bone dry state, it is again weighed and the beam brought to a position of balance by appropriate adjustment of the counterpoise and the operator notes the point on a scale provided upon the counterpoise at which the selected line intersects the edge of the counterpoise. In this way, a direct reading may be obtained of the percentage of moisture in the wood at the time the test piece was taken from the kiln and the operator will therefore know whether or not the drying should be continued.

The chart above referred to is carried by the beam of the scale and the shape of the series of lines thereon is preferably determined by experiment. The series of lines may be such that the scale on the counterpoise will be more open over the portion where measurements are made with greater frequency than over the remaining portion. For instance, in the drying of lumber, measurements of the percentage of moisture content are made relatively infrequently and these need not be accurate until the percentage has been reduced to or below approximately 10% and therefore the curvature of the lines on the chart may be intentionally made such that the scale on the counterpoise is more open between zero and 10 than above 10.

The invention will be better understood by reference to the accompanying drawings, which show the preferred embodiment of the invention. In these drawings, Figure 1 is an elevation of the scale; Fig. 2 is an end view; Fig. 3 is a transverse section through the plate bearing the chart and the counterpoise; and Fig. 4 is a sectional detail view through the counterpoise.

Referring to these drawings, 5 indicates the base of the scale on which is a standard 6 having the beam 7 of the scale mounted to rock thereon upon a knife edge bearing. From one end of the beam is suspended a pan 8 upon which the articles to be weighed are placed and this end of the beam is provided with some such means as a threaded rod 9 and weights 10 thereon for the purpose of adjusting the scale so as to obtain accuracy.

The opposite arm of the beam 7 is in the form of a flat plate 11 having a chart thereon. The chart may be drawn or printed upon a sheet of celluloid or similar material or the lines of the chart may be etched in the metal of the plate 11. The chart consists of a scale 12 having scale markings from zero to 100 appropriately designated, and, in addition thereto, a series of curved lines 13, more or less parallel, extending downwardly from the markings of the scale 12.

Coöperating with the chart on the plate 11 is a counterpoise consisting of two strips 14 and 15 lying on opposite sides of the plate 11 and secured together at their ends by screws 16. The plate 14 is cut, as shown in Fig. 1, to form an index 17 adapted to coact with the scale 12 and along one of the edges of the plate 14 is a series of scale markings appropriately designated from zero to 100, the zero line directly overlying the lower boundary line of the scale 12.

The base 5 is provided with a second standard 18 having a slot therein which forms a guide for the extreme end of the beam 7. On the side of the upper portion of the standard 18 is a scale 19 with which an index 20 on the beam coacts to facilitate determining when the beam is accurately poised.

In using the scale for determining the percentage of moisture contained in a piece of wood, the piece is first placed upon the pan 8 and the beam 7 brought to a poised condition by adjusting the counterpoise lengthwise along the arm 11 of the beam. When the beam has been poised as shown by reference to the index 20 and the scale 19, the position of the counterpoise is accurately noted by reference to the point on scale 12 with which the index 17 coacts. This point is noted and the piece of wood is then removed from the pan and dried to a bone dry condition, whereupon it is again placed upon the pan 8 and the beam again poised by movement of the counterpoise to the left to such extent as may be found necessary. This having been done, the operator follows the curved line 13 running down and to the left from the point on scale 12 selected in the previous operation and ascertains where the selected line intersects the edge of the counterpoise and by reference to the scale upon the counterpoise he reads the number appropriate to this point of intersection of the curved line with the edge of the counterpoise. This number represents the percentage of moisture content of the piece of wood at the time it was first weighed.

In Fig. 1, only a few of the numerous curved lines which would appear upon the chart are shown for the purpose of clearness, these several lines extending downwardly from the tens point upon the scale 12. It will be understood, however, that the charts as made would be provided with lines extending down from a greater number or all of the scale markings constituting the scale 12, those extending from the tens point being heavier than the others. Also, these several curved lines would preferably be shaped as approximately indicated in Fig. 1, for coaction with a scale upon the counterpoise, which is more open between the zero and tens points than between the points from 10 to 100, so that greater accuracy may be obtained in measurements of percentages under 10.

As shown in Fig. 4, the upper plate 14 of the counterpoise is preferably beveled at the edge thereof where the readings are made so that the scale markings at the edge of the plate lie close to the surface of the chart on the arm of the beam. The scale markings for the scale on the counterpoise may be provided upon a strip which is secured to the plate 14 or these scale markings may be etched directly in the plate.

I claim:

1. A computing scale comprising the combination of a support, a beam pivotally mounted thereon, a pan on one arm of the beam, a chart on the other arm of the beam including a scale and a plurality of lines extending from the marks of the scale in the same general direction, and a counterpoise movable back and forth upon the arm of the beam which carries the chart, said counterpoise being provided with an index for coaction with the scale upon the chart and a scale extending substantially transverse to the scale upon the chart and being adapted to be moved to a position for intersecting any one of said lines upon the chart, the scale upon the counterpoise being more open over one portion thereof than over the remainder and the lines upon the chart being shaped for coaction with a scale so formed; substantially as described.

2. A computing scale for measuring the moisture content of a piece of lumber comprising a support, a beam pivoted thereon, a pan suspended from one arm of the beam, a chart upon the other arm of the beam, a counterpoise movable over the chart, a plurality of lines upon the chart extending in the same general direction, an index upon the counterpoise for use in selecting any one of the several lines by reference to the position of the counterpoise relative to the chart, and a scale upon the counterpoise having scale markings and appropriate designations indicating percentages of moisture content by reference to the point on the scale where a selected line of the chart intersects the edge of the counterpoise; substantially as described.

3. A computing scale for measuring the moisture content of a piece of lumber comprising a support, a beam pivoted thereon, a pan suspended from one arm of the beam, a chart upon the other arm of the beam, a counterpoise movable over the chart, a plurality of lines upon the chart extending in the same general direction, an index upon the counterpoise for use in selecting any one of the several lines by reference to the position of the counterpoise relative to the chart, and a scale upon the counterpoise having scale markings and appropriate designations indicating percentages of moisture content by reference to the point on the scale where a selected line of the chart intersects the edge of the counterpoise, said counterpoise being beveled along one edge and having the scale markings thereon extending out to said edge so that the scale markings will lie close to the lines upon the chart; substantially as described.

In testimony whereof I affix my signature.

THOMAS D. PERRY.